(12) United States Patent
Sanders et al.

(10) Patent No.: US 7,437,044 B2
(45) Date of Patent: Oct. 14, 2008

(54) PURE SILICA CORE, HIGH BIREFRINGENCE, SINGLE POLARIZATION OPTICAL WAVEGUIDE

(75) Inventors: Paul E. Sanders, Madison, CT (US); Edward M. Dowd, Madison, CT (US); Andrew S. Kuczma, Clinton, CT (US); Trevor W. MacDougall, Simsbury, CT (US); Brian J. Pike, Wallingford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/614,606

(22) Filed: Dec. 21, 2006

(65) Prior Publication Data

US 2008/0151254 A1  Jun. 26, 2008

(51) Int. Cl.
*G02B 6/24* (2006.01)
(52) U.S. Cl. .................. 385/126; 385/123; 385/124; 385/125
(58) Field of Classification Search .......... 385/123–126
See application file for complete search history.

(56) References Cited

U.S. PATENT DOCUMENTS

| | | | |
|---|---|---|---|
| 4,274,854 A | 6/1981 | Pleibel et al. | |
| 4,478,489 A | 10/1984 | Blankenship et al. | |
| 4,529,426 A | 7/1985 | Pleibel et al. | |
| 4,578,097 A | 3/1986 | Berkey | |
| 6,580,860 B1 * | 6/2003 | Varner | 385/123 |
| 7,177,512 B2 * | 2/2007 | Berkey et al. | 385/126 |

FOREIGN PATENT DOCUMENTS

| | | |
|---|---|---|
| EP | 0 098 102 | 11/1984 |
| GB | 2012983 | 8/1979 |
| WO | WO 02/079827 | 10/2002 |

OTHER PUBLICATIONS

GB Search Report, Application No. GB0800759.3, dated Mar. 31, 2008.

* cited by examiner

*Primary Examiner*—Frank G Font
*Assistant Examiner*—Eric Wong
(74) *Attorney, Agent, or Firm*—Patterson & Sheridan, L.L.P.

(57) ABSTRACT

Methods and apparatus provide for birefringent waveguides suitable for optical systems exhibiting polarization dependence such as interferometer sensors including Sagnac interferometric fiber optic gyroscopes (IFOG). The waveguides, for some embodiments, may offer single polarization performance over lengths of about a kilometer or more due to polarization dependent attenuation. According to some embodiments, the waveguides incorporate a pure silica core for resistance to radiation-induced attenuation (RIA).

21 Claims, 4 Drawing Sheets

PURE SILICA CORE, HIGH BIREFRINGENCE, SINGLE POLARIZATION OPTICAL WAVEGUIDE

GOVERNMENT RIGHTS IN THIS INVENTION

This invention was made with U.S. government support under contract number N00173-04-C-6024. The U.S. government has certain rights in this invention.

BACKGROUND OF THE INVENTION

1. Field of the Invention

Embodiments of the invention generally relate to optical waveguide structures for propagating light signals in a single polarization and to such structures and associated devices for employment in radioactive environments.

2. Description of the Related Art

Many optical components, such as fiber interferometric sensors, which measure the phase change due to optical path length changes in fiber optic implementations of Michelson, Mach Zehnder, Fabry-Perot, or Sagnac optical interferometers, require use of single mode optical fiber and waveguide devices. Such fibers may form components (e.g., the interferometers themselves, fiber gratings and optical fiber couplers) for use with various optical transmission or measurement devices such as interferometric fiber optic gyroscopes (IFOG). While only the lowest order bound mode can propagate with conventional single mode fiber, this light being guided may consist of a pair of orthogonally polarized eigenmodes such that cross-coupling between polarizations can cause interference and phase noise that can degrade sensor sensitivity and performance.

Optical systems which exhibit polarization dependence thus may require use of polarization maintaining (PM) optical fibers to reduce polarization cross-coupling. The PM optical fibers maintain the polarization state of polarized light signals launched into the fiber as the signals propagate through the length of the fiber due to birefringence of the fibers. However, cross-coupling still occurs in many applications with the PM optical fibers especially when coiling and packaging long lengths of the fiber for example in an IFOG, which introduces significant bending and mechanical perturbations that, along with any temperature fluctuations, promote cross-coupling between polarizations.

While maintaining polarization reduces occurrence of cross-coupling, some fibers operate to remove or eliminate any cross-coupled or otherwise unwanted polarization states to promote single-polarization operation. Performance, design, expense and manufacturability shortcomings of prior single polarization or polarizing fibers preclude use of these fibers in many operations and/or applications longer than a few meters. Examples of single polarization fibers include fibers having elliptical-shaped cores or lossy cladding regions to promote a difference in attenuation between polarization modes that achieves extinction of one polarization mode over fiber lengths of a few meters or less. However, guided polarization mode attenuation also occurs as a side effect limiting applications to fiber lengths of a few meters or less, such as in a polarizer filter or pigtail, since longer lengths tend to produce unacceptable low intensity levels of even the guided polarization mode that is to be measured or otherwise used. Other single polarization fibers utilizing more conventional core/cladding designs rely on differences in fundamental mode cutoff wavelength between polarization modes for single polarization operation. These fibers typically operate over a narrow wavelength band that is highly sensitive to fiber length, typically several meters, and the amount of bending placed on the length of fiber. This sensitivity results in limited packaging flexibility in achieving a desired polarization extinction.

In an exemplary application, a Sagnac interferometer may form an IFOG sensor constructed with long lengths (e.g., multiple kilometers) of sensing fiber since sensitivity is proportional to the sensing fiber length. However, increases in length of the fiber amplify undesired polarization effects that impair sensor performance, which is limited by signal strength to phase noise (i.e., optical signal-to-noise ratio, OSNR) and is hence proportional to the amount of polarization cross-coupling. In addition, applications of the IFOG sensor include navigation systems employed in space and military operations where ionizing or nuclear radiation-induced attenuation (RIA) further contributes to signal loss and thus reduction in optical signal-to-noise ratio. Radiation resistant fibers include single mode designs that permit significant polarization cross-coupling. Problems associated with the RIA and/or the polarization cross-coupling thwart attaining critical performance requirements and prevent ability to maintain design OSNR for these IFOG sensors.

Therefore, there exists a need for improved methods and waveguides that propagate light signals in a single polarization. A further need exists for such single polarization waveguides with improved resistance to radiation-induced attenuation to enable devices such as an IFOG utilizing the waveguide, to be employed in radioactive environments.

SUMMARY OF THE INVENTION

Embodiments of the invention generally relate to optical waveguide structures. For some embodiments, a polarization maintaining, single polarization propagating, optical waveguide includes a central core forming a light guiding path, an inner cladding layer surrounding the core and having a refractive index lower than the core, a stress region disposed around the inner cladding layer and defining in cross section an elliptical outer shape, wherein the stress region induces strain birefringence of the waveguide, an outer cladding layer surrounding the stress region, and a substrate layer disposed outside the outer cladding layer. In some embodiments, a method of forming a polarization maintaining, single polarization propagating, optical waveguide includes creating a preform having a core, an inner cladding layer surrounding the core, a stress region, an outer cladding layer surrounding the stress region, and a substrate layer disposed outside the outer cladding layer, wherein an outer surface of the preform has a non-circular cross section, and drawing the preform to produce the waveguide, wherein the drawing rounds the outer surface and makes the stress region assume in cross section an elliptical outer shape and induce strain birefringence of the waveguide.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention relate to birefringent waveguides suitable for optical systems exhibiting polarization dependence such as interferometer sensors including Sagnac interferometric fiber optic gyroscopes (IFOG). The waveguides, for some embodiments, may offer single polarization performance over lengths of about a kilometer or more due to polarization dependent attenuation. According to some embodiments, the waveguides incorporate a pure silica core for resistance to radiation-induced attenuation (RIA).

Figure 1:
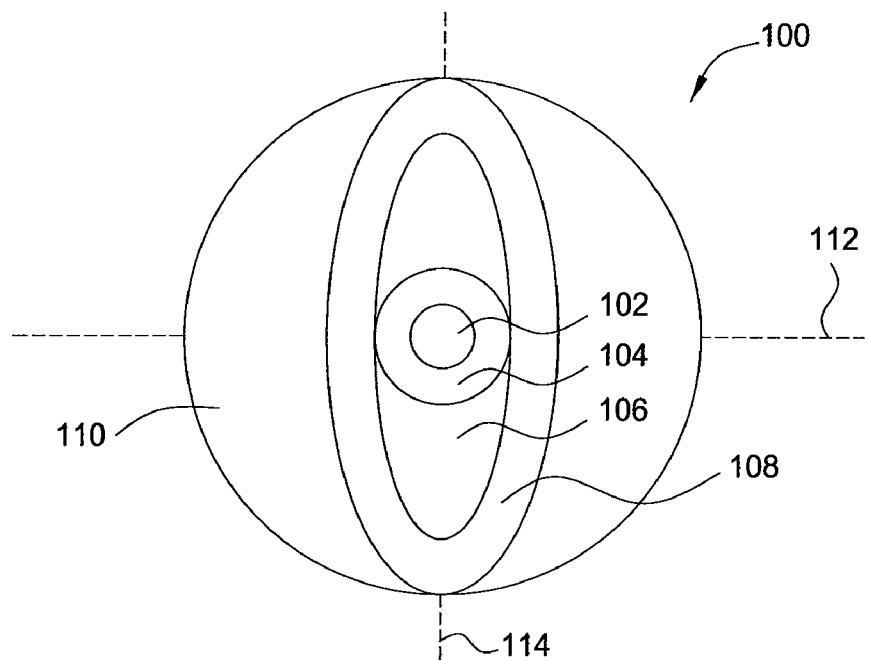
FIG. 1 is a schematic end view of an optical fiber according to embodiments of the invention.

FIG. 1 illustrates an end view of an optical fiber 100 defined by a core 102, an inner cladding 104, a stress region 106, an outer cladding 108, and a substrate layer 110. While depicted with reference to fiber optics, any optical waveguide structure may benefit from configurations, properties and structures attributed to the fiber 100 as described herein. The fiber 100 features the core 102 constituting pure silica and the claddings 104, 108 made of, for example, fluorinated silica. These core and cladding glasses have demonstrated improved resistance to RIA, which makes the fiber 100 suitable for long-term operation in space radiation environments or other radioactive environments, as well as benign environments where applications lack significant exposure of the fiber 100 to radiation.

The core 102 defines an at least substantially circular cross section surrounded by the inner cladding 104 that delineates an at least substantially round annular shaped cross section. Doping with, for example, fluorine (F) provides refractive index lowering of the claddings 104, 108 relative to the core 102. This difference in refractive index facilitates guiding light input into the fiber 100 along the core 102. Further, doping with, for example, germanium (Ge) and boron (B) of the stress region 106 produces a refractive index of the stress region 106 that is also lower than the core 102 but at least close to and/or higher than the claddings 104, 108, which may have substantially similar refractive indices for some embodiments.

The stress region 106 disposed between the inner and outer claddings 104, 108 makes the outer cladding 108 assume an asymmetric shape such as an elliptical band shaped cross section during manufacturing of the fiber 100. As a result of these shapes, the outer cladding 108 comes in close proximity to, but not necessarily touching, the inner cladding 104 in the direction of a minor axis 112 of the fiber 100. Further, the elliptical band shaped cross section of the outer cladding 108 distances the outer cladding 108 from the inner cladding 104 in the direction of a major axis 114 of the fiber 100. The substrate layer 110 made from silica, for example, and having a refractive index similar to the core 102 further surrounds the outer cladding 108 in a manner that forms an at least substantially circular outer circumference of the fiber 100.

Asymmetric shaping of the stress region 106 around the core 102 imparts stress-induced birefringence such that the fiber 100 tends to maintain the polarization of the light input into the fiber 100 as the light propagates through the core 102 along the length of the fiber 100. Further, because the refractive indices of the stress region 106 and inner and outer claddings 104, 108 are substantially similar, the effective optical cladding thickness is different between the axes 110, 112 of the fiber 100 with the minor axis 112 substantially thinner. The thinner effective optical cladding along the minor axis promotes leaky guidance and/or other factors such as absorption and light pulling structures bestow a different attenuation rate between polarizations, thereby promoting single polarization operation of the fiber 100 over kilometer lengths of the fiber 100.

Figure 2:
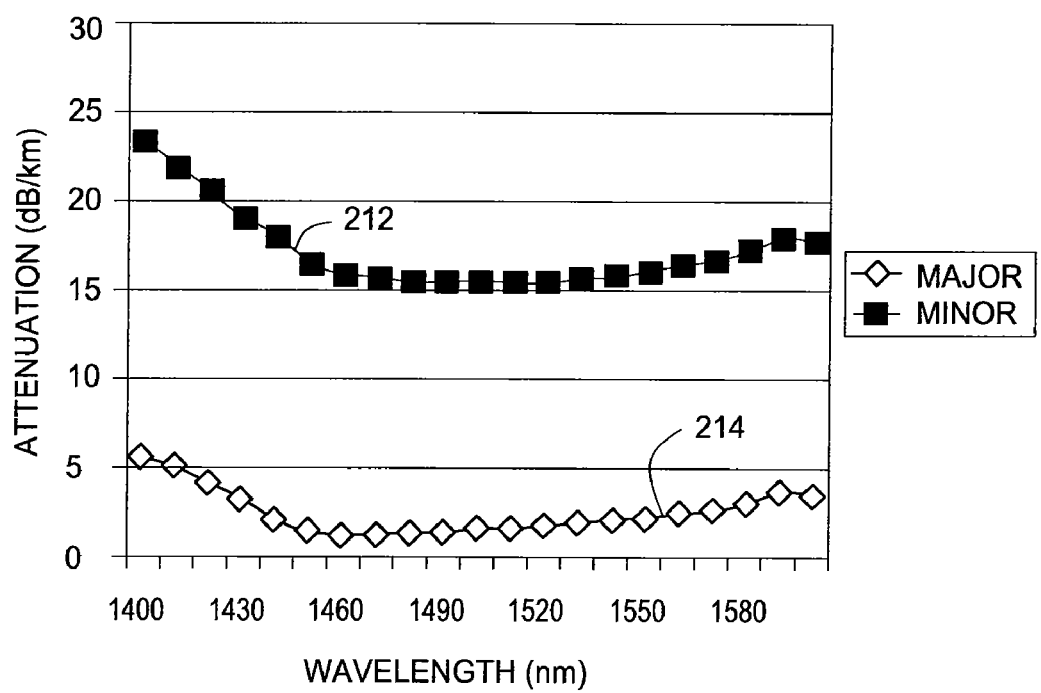
FIG. 2 is a plot of polarized spectral attenuation for the fiber shown in FIG. 1.

FIG. 2 graphs a polarized spectral attenuation for the fiber 100 to illustrate the different attenuation rate between polarizations for various wavelengths. Polarization eigenmodes propagating in the core 102 oriented in alignment with the minor axis 112 attenuate according to dropped curve 212 while polarization eigenmodes aligned with the major axis 214 experience loss according to guided curve 214. The guided curve 214 plots major axis attenuation rate of the light at 1550 nanometers (nm) as being about 1.5 decibels per kilometer (dB/km). With reference to the dropped curve 212, leaky mode and/or other factors attribute to about 15.0 dB/km loss in light strength value of the minor axis at 1550 nm. This attenuation rate difference between polarizations results in single polarization operation of the fiber 100 with a −14.0 dB polarization extinction for each kilometer of the fiber 100. For example, a 3.0 km sensing coil, which is suitable in length for navigational-grade IFOG, formed using the fiber 100 provides −42.0 dB extinction and guided mode attenuation of 4.5 dB, thereby remaining well within a power budget for these sensors. In other words, less than a fraction of a percentage of any undesired cross-coupled light, if present, remains after propagating a few kilometers or less within the fiber 100 while leaving detectable levels of the polarization state wanted for analysis.

Figure 3:
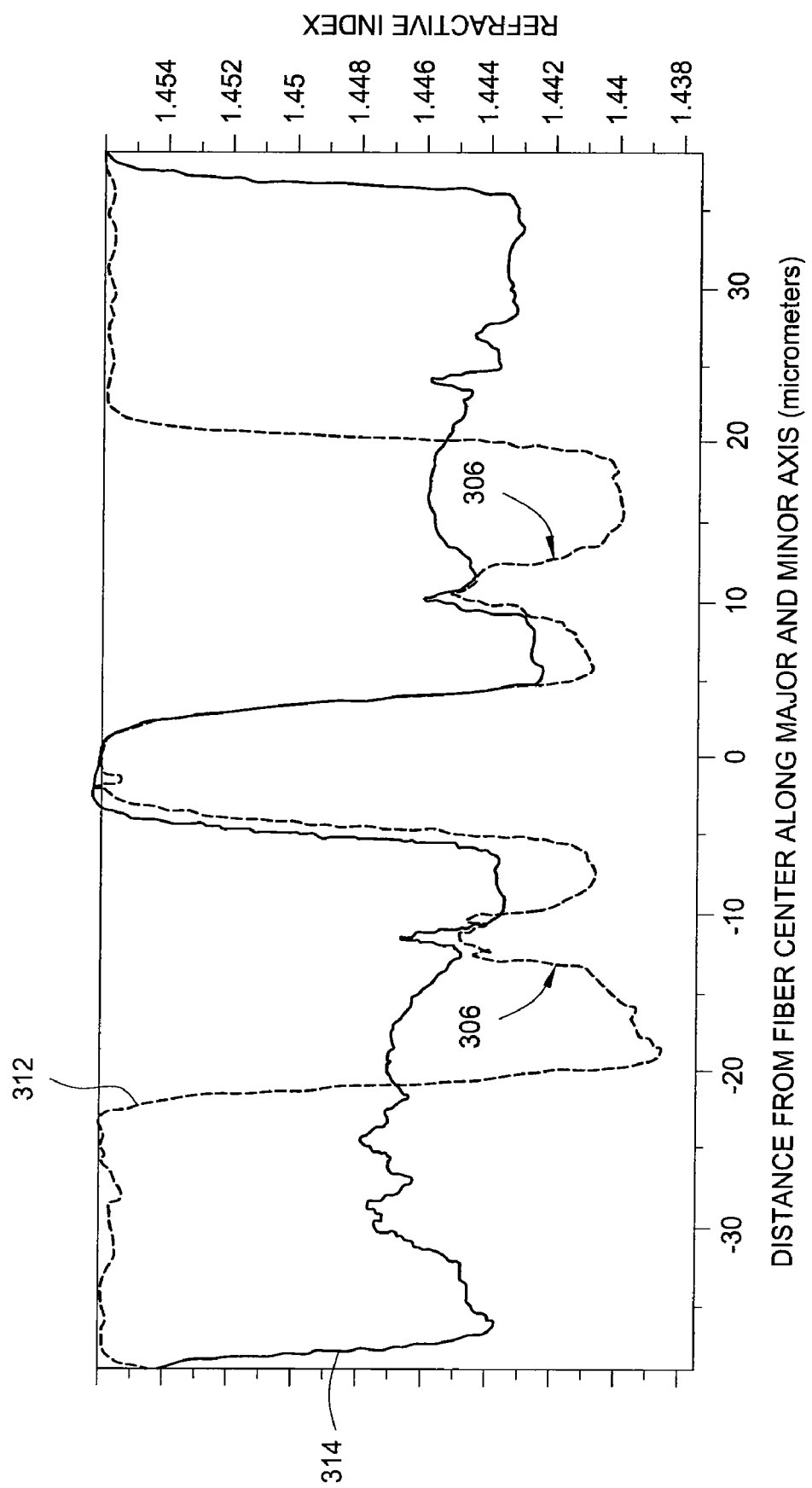
FIG. 3 is a graph of refractive index profiles across both a major axis and a minor axis of the fiber shown in FIG. 1.

FIG. 3 plots a refractive index profile across the major axis 114 of the fiber 100 represented by solid curve 314 and the minor axis 112 of the fiber 100 depicted as dashed curve 312. Since depressed-index cladding is subject to tunneling or leaky mode guidance, part of the mode that overlaps the claddings 104, 108 and stress region 106 can tunnel and leak light into the claddings 104, 108 and stress region 106 and be attenuated. Rate of this leaky mode attenuation depends on several factors including an effective cladding thickness provided by the claddings 104, 108 and stress region 106 due to the refractive indices of the claddings 104, 108 and stress region 106 compared to the core 102 and the substrate layer 110. Visible in the solid and dashed curves 312, 314 and the disposition of the substrate layer 110 within the fiber 100, the effective cladding thickness ends at about 20 micrometers (μm) in the direction of the minor axis 112 yet extends further to about 35 μm along the major axis 114.

In addition to the effective cladding thickness, the inner cladding 104, the stress region 106, and the outer cladding 106 define along the major axis 114 refractive indices (see, areas between about 5 μm and about 35 μm) according to the solid curve 314 that provide substantially consistent effective cladding properties to contain the light in the core 102. By contrast, the inner cladding 104, the stress region 106 and the outer cladding 106 possess in conformance with the dashed curve 312 more differing refractive indices within a shorter distance (see, areas between about 5 μm and about 20 μm) in the minor axis 112 and hence inconsistent effective cladding properties. In particular, lower refractive indices associated with the inner cladding 104 and the outer cladding 108 bound peaks 306 of the dashed curve 312 corresponding with the stress region 106. Further, the peaks 306 occur in proximity (e.g., about 5 μm) of the core 102 to enable pulling of light into the stress region 106 along the minor axis 112 such that the stress region 106 in substantially only the direction of the minor axis 112 acts as a partial annular cladding mode carrier that is lossy due to the stress region 106 being a poor waveguide.

Figure 4:
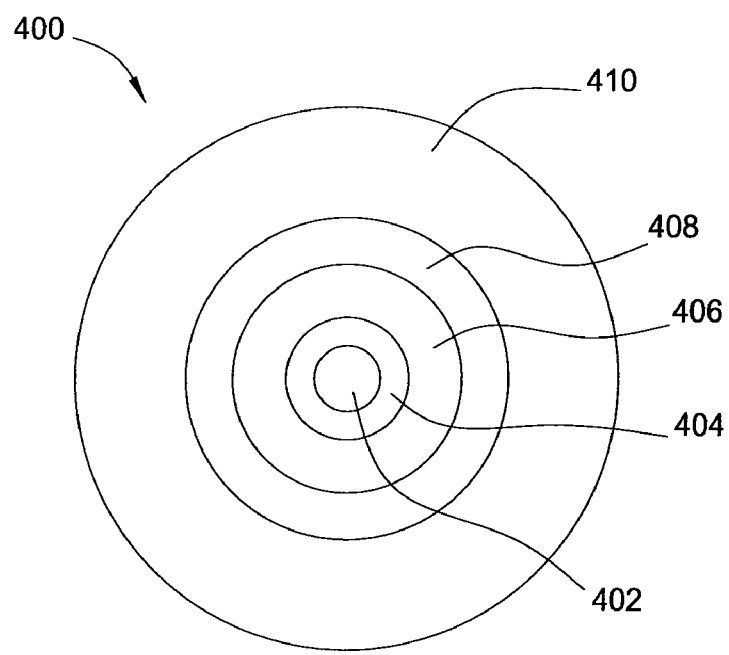
FIG. 4 is a schematic end view of a preform utilized to manufacture the fiber shown in FIG. 1.

FIG. 4 illustrates a preform 400 utilized to manufacture the fiber 100. The preform 400 includes a core layer 402, an inner cladding layer 404, a stress region layer 406, an outer cladding layer 408, and an external substrate tubing 410 that are all circular and arranged concentric to one another upon completion of deposition processes forming the preform 400. For some embodiments, the core layer 402 contains at least substantially pure silica ($SiO_2$). Deposition of the cladding layers 404, 408 may occur in processes to provide the cladding layers 404, 408 with about 15.0 mol % fluorine in silica. Additionally, silica may form the external substrate tubing 410.

Deposition processes produce the stress region layer 406 with sufficient doping to change a thermal coefficient of expansion for the stress region layer 406 relative to the core layer 402, the inner and outer cladding layers 404, 408, and the external substrate tubing 410. In addition, the doping may adjust the refractive index of the stress region layer 406 to at least approach matching the lower refractive index of the cladding layers 404, 408 relative to the core layer 402. Doping during deposition of the stress region layer 406 may produce about 50.0 mol % dopants that may be selected from boron and germanium. For some embodiments, the stress region layer 406 contains about equal amounts of boron and germanium, which concentrations may be adjusted to raise or lower the refractive index of the stress region layer 406.

Figure 5:
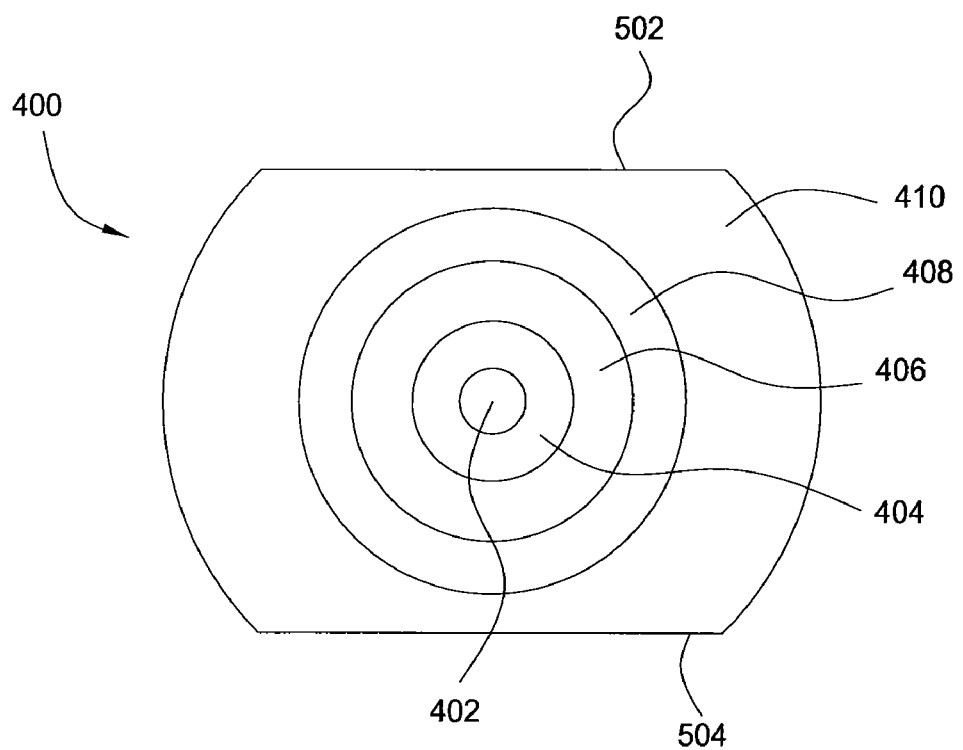
FIG. 5 is a schematic end view of the preform after shaping an outer surface of the preform to have a non-circular cross section and prior to drawing the preform, thereby producing the fiber shown in FIG. 1.

FIG. 5 shows the preform 400 after shaping an outer surface of the preform 400 and prior to drawing the preform 400, thereby producing the fiber 100 shown in FIG. 1. The shaping produces a non-circular cross section of the preform 400. For some embodiments, the external substrate tubing 410 may include lengthwise extending first and second parallel flattened surfaces 502, 504 to form the non-circular cross section of the preform 400. Other embodiments include the external substrate tubing 410 having likewise lengthwise extending parallel first and second machined surfaces but with concave machined surfaces to impart a more "peanut" shaped cross section, and pairs of lengthwise extending parallel surfaces to provide for a diamond shaped cross section.

Control of subsequent draw temperature and draw speed of the preform 400 to make the fiber 100 ensures the fiber 100 takes the shape and configuration described heretofore. During the drawing of the preform 400, the different thermal coefficient of expansion of the stress region layer 406 results in the stress region layer 406 having a relatively lower viscosity (i.e., more fluid) compared to the core layer 402, the inner and outer cladding layers 404, 408, and the external substrate tubing 410. Once heated, the outermost surface of the external substrate tubing 410 assumes a shape based on surface tension interactions corresponding with the least energy meaning that the outermost surface of the external substrate tubing 410 goes to a circular shape. This rounding of the first and second parallel flattened surfaces 502, 504 or other shaped surfaces enables the external substrate tubing 410 to achieve a substantially circular outer circumference and causes material displacement compensated for by the stress region layer 406 flowing toward an elliptical outer shape due to the viscosity difference. Further, the difference in thermal coefficient of expansion of the stress region layer 406 introduces the strain birefringence since the stress region layer 406 that is last to harden becomes confined by the external substrate tubing 410 restricting natural contraction as the stress region layer 406 cools and later hardens.

Figure 6:
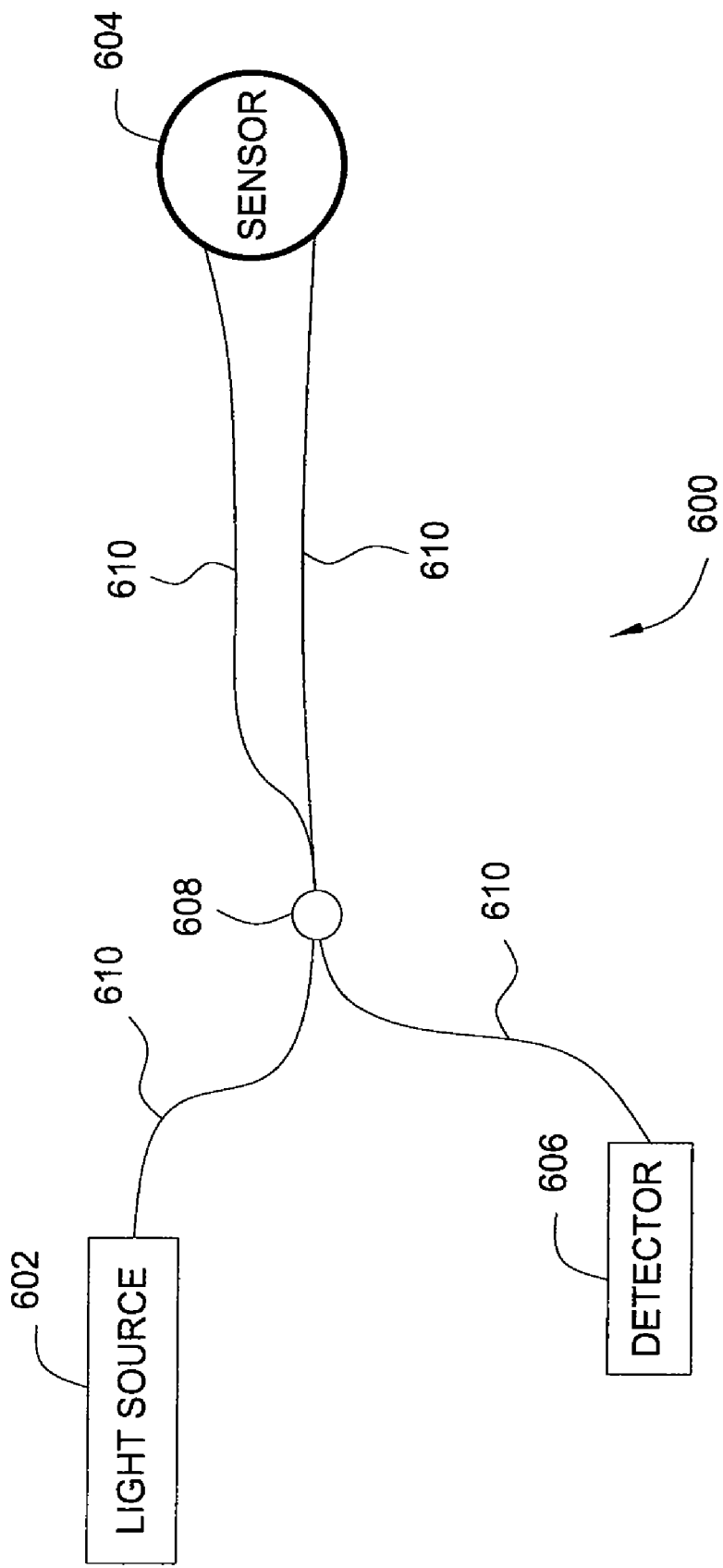
FIG. 6 is a sensing system utilizing optical fiber, according to embodiments of the invention, such as the fiber shown in FIG. 1.

FIG. 6 illustrates a sensing system 600 utilizing optical waveguides such as the fiber 100. The sensing system 600 includes a light source 602, an interferometric sensor such as an IFOG formed from an optical fiber sensing coil 604 that may contain between 200 m and 5.0 km of fiber, and a detector 606. In operation, the light source 602 launches input light into the sensing coil 604 via transmission optical fibers 610 connected by coupler 608. Rotation of the sensing coil 604 affects the input light, thereby generating response light signals. The response light signals from the sensing coil 604 propagate through transmission optical fibers 610 to the detector 606 that then receives the response light signals for measuring rotation of the sensing coil 604. For some embodiments, one or more of the sensing coil 604, the transmission optical fibers 610, and the coupler 608 incorporate the fiber 100 shown in FIG. 1.

While the foregoing is directed to embodiments of the present invention, other and further embodiments of the invention may be devised without departing from the basic scope thereof, and the scope thereof is determined by the claims that follow.

What is claimed is:

1. A polarization maintaining, single polarization propagating, optical waveguide, comprising:
    a central core forming a light guiding path;
    an inner cladding layer surrounding the core and having a refractive index lower than the core;
    a stress region disposed around the inner cladding layer and defining in cross section an elliptical outer shape, wherein the stress region induces strain birefringence of the waveguide;
    an outer cladding layer surrounding the stress region, wherein the stress region has a higher refractive index than the inner and outer cladding layers; and
    a substrate layer disposed outside the outer cladding layer.

2. The optical waveguide of claim 1, wherein the inner cladding has a round annular shaped cross section.

3. The optical waveguide of claim 1, wherein the inner and outer cladding layers are substantially alike in composition.

4. The optical waveguide of claim 1, wherein the core has a circular cross section.

5. The optical waveguide of claim 1, wherein the core consists of silica.

6. The optical waveguide of claim 1, wherein the core guides light of one polarization with less attenuation than another polarization.

7. The optical waveguide of claim 1, wherein the core guides light at 1550 nanometers with attenuation at a first polarization less than 3.0 decibels per kilometer (dB/km) and attenuation at a second polarization more than 15.0 dB/km.

8. The optical waveguide of claim 1, wherein the inner and outer cladding layers are doped with fluorine.

9. The optical waveguide of claim 1, wherein the substrate layer defines a circular outer circumference.

10. The optical waveguide of claim 9, wherein the substrate layer defines an outermost external surface of the waveguide.

11. The optical waveguide of claim 1, wherein the stress region has a different thermal coefficient of expansion than the substrate layer.

12. The optical waveguide of claim 1, wherein the stress region is doped with germanium and boron.

13. The optical waveguide of claim 1, wherein the substrate layer consists essentially of silica.

14. The optical waveguide of claim 1, wherein:
the core consists of silica;
the inner and outer cladding layers are doped with about 15 mol % fluorine; and
the stress region is doped with about 50 mol % dopants selected from germanium and boron.

15. The optical waveguide of claim 14, wherein the substrate layer consists essentially of silica.

16. A method of forming a polarization maintaining, single polarization propagating, optical waveguide, comprising:
creating a preform having a core, an inner cladding layer surrounding the core, a stress region, an outer cladding layer surrounding the stress region, and a substrate layer disposed outside the outer cladding layer, wherein an outer surface of the preform has a non-circular cross section and the stress region has a higher refractive index than the inner and outer cladding layers; and
drawing the preform to produce the waveguide, wherein the drawing rounds the outer surface and makes the stress region assume in cross section an elliptical outer shape and induce strain birefringence of the waveguide.

17. The method of claim 16, further comprising forming parallel flattened surfaces around the substrate layer to provide the non-circular cross section.

18. The method of claim 16, further comprising forming parallel concave machined surfaces around the substrate layer to provide the non-circular cross section.

19. The method of claim 16, further comprising forming pairs of parallel flattened surfaces arranged around the substrate layer to provide a diamond-shaped cross section.

20. A sensing system, comprising:
a light source;
an interferometric sensor coupled to the light source, wherein the sensor includes a polarization maintaining, single polarization propagating, optical waveguide, comprising:
a core forming a light guiding path;
an inner cladding layer surrounding the core and having a refractive index lower than the core;
a stress region disposed around the inner cladding layer and defining in cross section an elliptical outer shape, wherein the stress region induces strain birefringence of the waveguide;
an outer cladding layer surrounding the stress region, wherein the stress region has a higher refractive index than the inner and outer cladding layers; and
a substrate layer disposed outside the outer cladding layer; and
a sensor response signal detector coupled to the sensor.

21. The sensing system of claim 20, wherein the sensor comprises a navigational-grade interferometric fiber optic gyroscope (IFOG) having multiple kilometers of the waveguide coiled into a sensing coil.

* * * * *